UNITED STATES PATENT OFFICE.

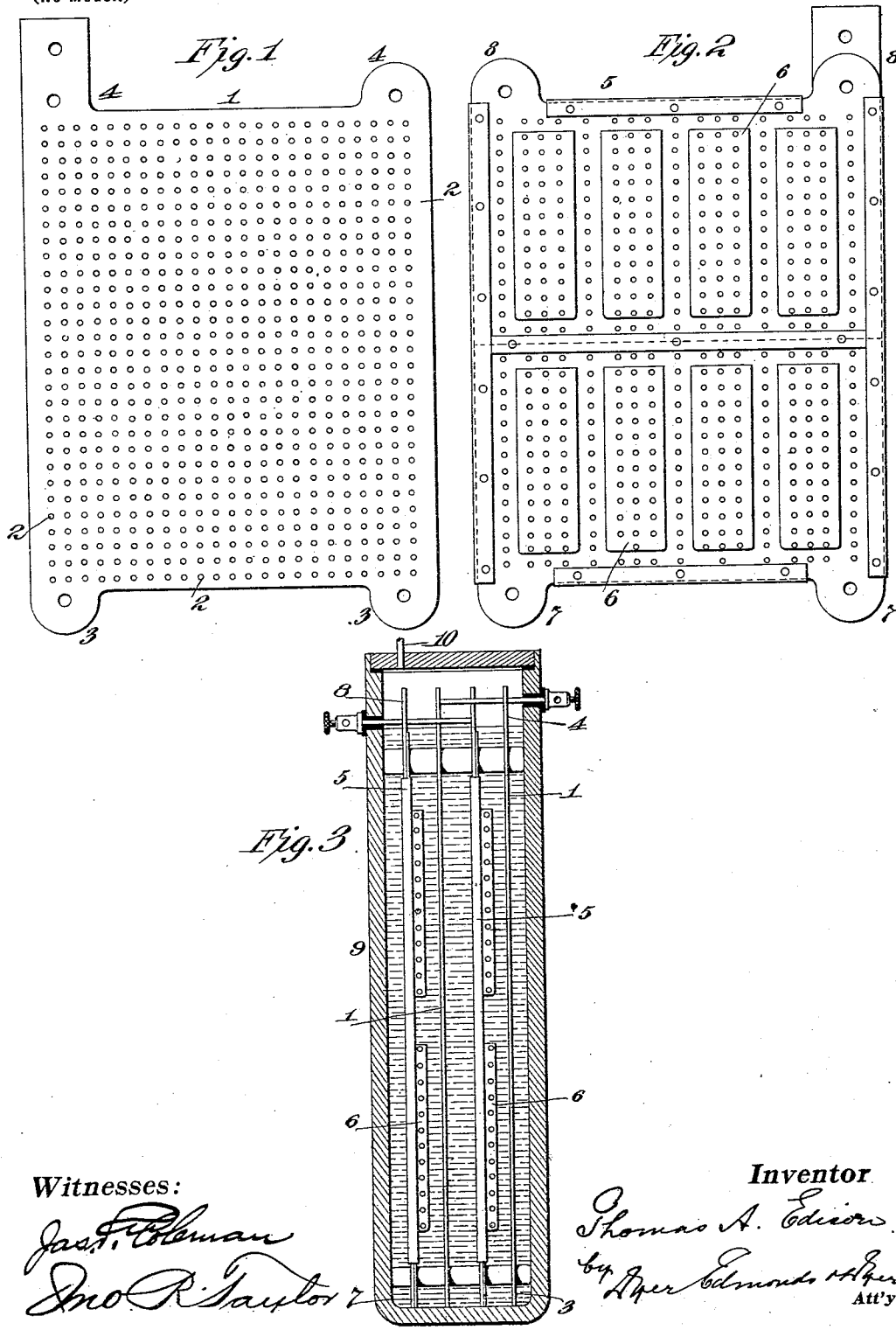

THOMAS A. EDISON, OF LLEWELLYN PARK, NEW JERSEY.

REVERSIBLE GALVANIC BATTERY.

SPECIFICATION forming part of Letters Patent No. 684,204, dated October 8, 1901.

Application filed October 31, 1900. Serial No. 34,995. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Reversible Galvanic Batteries, (Case No. 1,049,) of which the following is a description.

My invention relates to improvements in reversible galvanic cells or so-called "storage batteries," and the invention relates particularly to batteries of the type employing zinc as an active material in an alkaline solution.

I have found from experiment that zinc is deposited in spongy form on different metals from an alkaline solution largely because of the local electric action between the zinc and such metal, with the consequent formation of free hydrogen and zinc hydroxid, both of which determine the spongy and non-adherent character of the deposited zinc. I have also ascertained that the deposit of zinc from an alkaline solution thereof on different metals heretofore used in batteries of this type is impracticable without the employment of mercury and that only relatively small amounts of zinc can be thus electroplated on an amalgamated electrode before the latter becomes also spongy in character. These objections have been met in practice by other experimenters with batteries of this type and have so far been insurmountable.

My present invention consists principally in the utilization of metallic magnesium as the support upon which the zinc is electrodeposited when the battery is reversed after discharging. Magnesium standing higher in the electric series of active metals than zinc cannot obviously produce any action on the latter. Therefore if an electric action did occur in my improved battery between the metals it would necessarily affect the magnesium and not the zinc. I find, however, that in practice the magnesium is not attacked, but remains absolutely neutral. There is no local action between the two metals, and neither hydrogen nor zinc hydroxid is formed, as was the case with batteries of the type heretofore made employing zinc as the active material in an alkaline solution. With my improved battery the zinc is plated out of the solution upon the magnesium support in a dense and adherent form, and even with a large volume of current very considerable amounts of zinc can be thus deposited before the surface assumes a non-coherent character. I cannot positively explain why the magnesium is not attacked and why local action does not take place thereon, as ordinarily magnesium is much more oxidizable than zinc. I believe, however, as the result of numerous experiments that the phenomenon is satisfactorily explained by the supposition that the magnesium is coated with an extremely thin layer of oxid insoluble in the liquid and that the zinc is deposited upon the film of oxid and not upon the metal itself. If this supposition is correct, then the electric charges of the zinc ions apparently pass to the metal through this layer.

In my improved battery I prefer to use copper oxid as the negative element, as I have explained in an application for Letters Patent (Case No. 1,048) filed on even date herewith. In said application I point out the difficulties which were met by previous experimenters in the use of copper oxid as a depolarizer, due to the presence in the solution of a blue soluble copper salt, which being reduced to the metallic state by coming in contact with the active metal, such as zinc, produced local action with the rapid deterioration of the battery, and I have explained how this objection can be overcome by converting the copper into an extremely finely divided form—such, for example, as by the treatment of pure carbonate of copper by hydrogen at the lowest possible temperature that will insure perfect reduction. In my present battery, therefore, I prefer to use finely divided copper, which is first molded in form, then subjected to heat, so as to convert it into the black oxid, after which it is finally reduced to metallic copper by electrolytic action, so that in charging it will be reoxidized by the current to the red oxid, ($Cu_2O$.) The copper oxid so treated in the form of blocks or cakes of the desired size is preferably supported by perforated receptacles attached to nickel or nickel-plated plates, as I have described in my said application.

The solution employed in my improved battery is preferably about a twenty-per-cent.

solution of caustic soda, to which zinc hydroxid is added until it is nearly saturated.

In order that my invention may be better understood, attention is directed to the accompanying drawings, forming part of this specification, and in which—

Figure 1 is a plan view of one of the magnesium supports on which the zinc is plated during the charging; Fig. 2, a similar view of the plate for carrying the negative element, and Fig. 3 a vertical section through a cell formed of four elements.

In all of the above views corresponding parts are represented by the same numerals of reference.

1 represents the magnesium supports in the form of thin plates, having numerous perforations 2 therein and with the usual lugs 3 and 4 at the bottom and top by means of which the plates may be assembled and electrically connected together. I find that by employing numerously-perforated magnesium plates the zinc deposit is more adherent, while at the same time the deposit is more evenly distributed over the entire surface than if the plates are imperforate, in which latter case a very much greater deposit takes place at the edges thereof than at other points. The negative elements are formed, preferably, as I have described in my said application, of nickel or nickel-plated plates 5, carrying perforated nickel or nickel-plated pockets or receptacles 6, secured thereto, the plates being formed with lugs 7 7 and 8 8, by which they may be assembled and electrically connected in the usual way. I prefer, as stated, to employ copper oxid as the depolarizer for the negative element made by reducing pure carbonate of copper by hydrogen at the lowest possible temperature that will insure perfect reduction to obtain the copper in finely-divided form, which is then molded under slight pressure in blocks of the proper shape, which blocks are then baked in a closed chamber until the copper is oxidized to the black oxid, (CuO,) after which the oxid so secured is reduced electrically to the metallic copper. These blocks are then inserted in the receptacles or pockets 6 and are ready for use.

When my improved cell is in a neutral or fully-discharged condition, the copper oxid plates or blocks will be reduced to the metallic state and the zinc will be in solution. In charging, the copper is oxidized and converted to the red oxid, ($Cu_2O$,) while the zinc is deposited electrically upon the magnesium electrodes. The charging is continued until about seventy-five per cent. of the zinc in the solution is thus deposited, whereupon the cell is ready to be discharged. In discharging obviously the reverse operations take place, the copper oxid being converted to the metallic state and the zinc going back into the solution. The voltage of my improved battery is .67 volts. In discharging it will be found that a point is reached where the voltage falls considerably, due to the approach to exhaustion of the oxygen in the copper, and the discharge should not be permitted to take place materially beyond that point. As shown, the positive and negative elements are properly connected and are supported in a suitable inclosing jar 9, hermetically sealed from the air, said jar being provided with a vent 10 for the escape of any gas generated therein.

Having now described my invention, what I claim as new, and desire to secure by Letters Patent, is as follows:

1. In a reversible galvanic cell, an alkaline solution, a negative element, a positive electrode-support of metallic magnesium, and a metal in solution capable of being electrodeposited upon the magnesium to constitute the positive electrode, substantially as set forth.

2. In a reversible galvanic cell, an alkaline solution, a negative element, a flat numerously-perforated positive electrode-support of metallic magnesium, and a metal in solution capable of being electrodeposited upon the magnesium to constitute the positive electrode, substantially as set forth.

3. In a reversible galvanic cell, an alkaline zincate electrolyte, a magnesium support for receiving the deposit of zinc, and a negative electrode having a suitable depolarizer, substantially as set forth.

4. In a reversible galvanic cell, an alkaline zincate electrolyte, a flat numerously-perforated magnesium support for receiving the deposit of zinc, and a negative electrode having a suitable depolarizer, substantially as set forth.

5. In a reversible galvanic cell, an alkaline zincate electrolyte, a magnesium support for receiving the deposit of zinc, and a negative electrode having a depolarizer composed of copper sufficiently finely divided to prevent the formation of a soluble copper salt on oxidation, substantially as set forth.

6. In a reversible galvanic cell, an alkaline zincate electrolyte, a magnesium support for receiving the deposit of zinc, nickel receptacles immersed in said electrolyte, and copper in said receptacles sufficiently finely divided to be oxidized by the current without producing copper salts soluble in the solution, substantially as set forth.

This specification signed and witnessed this 15th day of October, 1900.

THOMAS A. EDISON.

Witnesses:
J. F. RANDOLPH,
J. A. BOEHME.